(12) United States Patent
Ebert

(10) Patent No.: US 11,229,216 B2
(45) Date of Patent: Jan. 25, 2022

(54) CLIPPING MACHINE WITH IMPROVED DISCHARGE DEVICE

(71) Applicant: Poly-clip System GmbH & Co. KG, Hattersheim (DE)

(72) Inventor: Detlef Ebert, Bad Nauheim (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 16/863,366

(22) Filed: Apr. 30, 2020

(65) Prior Publication Data

US 2020/0345018 A1 Nov. 5, 2020

(30) Foreign Application Priority Data

May 2, 2019 (EP) ..................................... 19172393

(51) Int. Cl.
*A22C 11/00* (2006.01)
*A22C 11/12* (2006.01)
*A22C 11/02* (2006.01)

(52) U.S. Cl.
CPC .......... *A22C 11/125* (2013.01); *A22C 11/008* (2013.01); *A22C 11/02* (2013.01)

(58) Field of Classification Search
CPC ..... A22C 11/00; A22C 11/125; A22C 11/245; A22C 11/02; A22C 11/10; A22C 11/0227; A22C 13/003; A22C 15/01

(Continued)

(56) References Cited

U.S. PATENT DOCUMENTS 4,017,941 A * 4/1977 Raudys .............. A22C 11/0254
452/31
5,743,792 A * 4/1998 Hanten .............. A22C 11/0245
452/29

(Continued)

FOREIGN PATENT DOCUMENTS

DE 202004007711 U1 9/2004
DE 202010006380 U1 10/2011

(Continued)

OTHER PUBLICATIONS

Russian Patent Office; Application No. 2020115041; Official Action dated Jul. 14, 2020.

(Continued)

*Primary Examiner* — Richard T Price, Jr.
(74) *Attorney, Agent, or Firm* — Fitch, Even, Tabin & Flannery LLP

(57) ABSTRACT

The present invention relates to a clipping machine and a method for operating a clipping machine for producing sausage-shaped products, like sausages, by filling a flowable filling material into a tubular or bag-shaped packaging casing and closing said packaging casing by at least one closure clip. The clipping machine comprises a filling tube for feeding the filling material in a feeding direction into the tubular or bag-shaped packaging casing stored on the filling tube and being closed at its front end, a gathering device for gathering the filled packaging casing and for forming a gathered portion thereto, wherein the gathering device includes a first displacer unit and a second displacer unit, and wherein the second displacer unit is reversibly movable in the feeding direction for forming a filling material free plait-like portion at the gathered portion of the filled packaging casing, a clipping device having at least a first and a second closing tool being reversibly movable between an opened position and a closed position, for applying at least (Continued)

one closure clip to the plait-like portion and closing said closure clip when the closing tools are in their closed position, and a discharge device for discharging a sausage-shaped product just produced from the clipping machine in a transportation direction, wherein the position of the discharge device along the transportation direction and relative to components located upstream the discharge device can be adjusted. The clipping machine further comprises a sensor device for detecting the position of the discharge device relative to components of the clipping machine located upstream the discharge device.

15 Claims, 4 Drawing Sheets

(58) Field of Classification Search
USPC .................. 452/30–32, 35–37, 46–48, 51
See application file for complete search history.

(56) References Cited

U.S. PATENT DOCUMENTS

| | | | | |
|---|---|---|---|---|
| 6,659,853 | B1 * | 12/2003 | Hergott | A22C 11/0227 452/31 |
| 6,855,046 | B2 * | 2/2005 | Cate | A22C 11/0236 452/30 |
| 7,179,057 | B2 * | 2/2007 | Walker | F04D 29/245 416/186 R |
| 8,323,079 | B2 * | 12/2012 | Hanten | A22C 11/125 452/31 |
| 8,870,634 | B2 * | 10/2014 | Niedecker | A22C 11/125 452/37 |
| 8,882,570 | B2 * | 11/2014 | Hanten | A22C 11/0245 452/37 |
| 9,165,589 | B1 * | 10/2015 | Huang | H02K 41/0356 |
| 2003/0073397 | A1 * | 4/2003 | Stanley | A22C 11/02 452/35 |
| 2014/0194041 | A1 * | 7/2014 | Pitzer | A22C 11/006 452/49 |
| 2016/0095326 | A1 * | 4/2016 | Ebert | A22C 11/0245 452/35 |

FOREIGN PATENT DOCUMENTS

| | | |
|---|---|---|
| EP | 2489274 A1 | 8/2012 |
| EP | 3001909 A1 | 4/2016 |
| RU | 2650033 C1 | 4/2018 |

OTHER PUBLICATIONS

EPO; Application No. 19172393.1; Extended European Search Report dated Nov. 6, 2019.

* cited by examiner

CLIPPING MACHINE WITH IMPROVED DISCHARGE DEVICE

CROSS-REFERENCE TO RELATED APPLICATION

The present application claims the benefit of priority of European Patent Application No. 19172393.1 filed on May 2, 2019, the contents of which are incorporated herein by reference in their entirety.

FIELD OF THE INVENTION

The present invention relates to a clipping machine for producing sausage-shaped products, like sausages, by filling a flowable filling material into a tubular or bag-shaped packaging casing and closing said packaging casing by at least one closure means, like a closure clip. The clipping machine comprises a filling tube for feeding the filling material in a feeding direction into the tubular or bag-shaped packaging casing stored on the filling tube and being closed at its front end, gathering means for gathering the filled packaging casing and for forming a gathered portion thereto, wherein the gathering means include a first displacer unit and a second displacer unit, and wherein the second displacer unit is reversibly movable in the feeding direction for forming a filling material free plait-like portion at the gathered portion of the filled packaging casing and a clipping device having at least a first and a second closing tool being reversibly movable between an opened position and a closed position, for applying at least one closure means to the plait-like portion and closing said closure means when the closing tools are in their closed position. The clipping machine further comprises a discharge device for discharging a sausage-shaped product just produced from the clipping machine in a transportation direction.

BACKGROUND OF THE INVENTION

From DE utility model 20 2004 007 711, a clipping machine as defined above for producing sausages is known. The clipping machine includes, inter alia, clipping tools and gathering tools in the form of two scissors. The scissors arranged downstream to the other scissors, referred to the feeding direction of the filling material, may be moved away from the upstream scissors for forming a filling material free plait-like portion on which closure clips can be applied by the clipping tools. A discharge conveyor is arranged downstream the gathering tools for sequentially discharging the sausages. The discharge conveyor is fixedly mounted to the frame work of the clipping machine.

The clipping machine for producing sausages, disclosed in PCT patent application WO 2011/134094, includes besides the clipping tools, a displacer device in the form of two pairs of displacer shears. One of the shear pairs is linearly movable relative to the other shear pair, for forming an elongated filling material free plait-like portion for producing slackly filled sausages. This known clipping machine has also a discharge conveyor that is fixedly mounted to the clipping machine and below the two pairs of displacer shears.

These known devices enable the production of sausage-shaped products by forming a filling material free plait-like portion to the filled casing portion, onto which at least one closure clip may be applied for closing at least the rear end of said filled casing portion. However, producing a slackly filled sausage-shaped product by forming an elongated plait-like portion to the filled casing portion, the length of the plait-like portion is limited by the position of the discharge conveyor. Particularly, when producing slackly filled sausage-shaped products by forming a plait-like portion that is shorter than the distance between the upstream end of the conveyor device and the downstream scissors, the danger exists that the sausage-shaped product may be damaged by immersing into the gap between the discharge device and the scissors.

Thus, it is an object of the present invention to provide a clipping machine which overcomes the above-mentioned drawbacks and which enables the production of sausage-shaped products with a reduced risk of damaging the products and the clipping machine.

SUMMARY OF THE INVENTION

According to the present invention, there is provided a clipping machine for producing sausage-shaped products, like sausages, by filling a flowable filling material into a tubular or bag-shaped packaging casing and closing said packaging casing by at least one closure means, like a closure clip. The clipping machine comprises a filling tube for feeding the filling material in a feeding direction into the tubular or bag-shaped packaging casing stored on the filling tube and being closed at its front end, gathering means for gathering the filled packaging casing and for forming a gathered portion thereto, wherein the gathering means include a first displacer unit and a second displacer unit, and wherein the second displacer unit is reversibly movable in the feeding direction for forming a filling material free plait-like portion at the gathered portion of the filled packaging casing, and a clipping device having at least a first and a second closing tool being reversibly movable between an opened position and a closed position, for applying at least one closure means to the plait-like portion and closing said closure means when the closing tools are in their closed position. The clipping machine according to the present invention further comprises a discharge device for discharging a sausage-shaped product just produced from the clipping machine in a transportation direction, wherein the position of the discharge device along the transportation direction and relative to components located upstream the discharge device can be adjusted. The clipping machine is further provided with a sensor device for detecting the position of the discharge device relative to components of the clipping machine located upstream the discharge device.

The adjustment of the discharge device along the transportation direction and relative to components located upstream the discharge device enables the configuration of the clipping machine in accordance with the specific sausage-shaped product to be produced. Furthermore, by the detection or indication of the position of the discharge device relative to components of the clipping machine located upstream the discharge device, it may be ensured that the sausage-shaped products produced in the clipping machine may securely be received by the discharge device without being damaged. Moreover, collisions between the discharge device and other components of the clipping machine located upstream the discharge device may be prevented, like between the upstream end of the discharge device and the displacer units, when moved relative to each other for forming a filling material free plait-like portion.

The inventive clipping machine thereby allows the production of sausage-shapes products of high quality, by a reduced risk of operating errors, and provides an additional safety feature by preventing collisions of machine elements.

The components of the clipping machine which are located upstream the discharge device and which make necessary a survey of the position of the discharge device, can be both stationary components of the clipping machine and those which can be moved reversibly in the transport or discharge direction of the product during the manufacturing process for said product. The latter can in particular be one of the displacer units, i.e. the second displacer unit, which can be moved reversibly in the direction of the discharge device, i.e. in the feeding direction of the filling material, to produce a filling material free plait-like portion. Of course, it is possible to monitor the position or the distance of the discharge device to the stationary components as well as to the reversibly movable components of the clipping machine by means of the sensor device.

In a preferred embodiment of the inventive clipping machine, an adjustment device is provided for adjusting the position of the discharge device relative to said components of the clipping machine located upstream the discharge device. The adjustment device enables the proper positioning of the discharge device, e.g. in accordance with the features of the sausage-shaped product to be produced, or specific production parameters of the clipping machine.

The adjustment device may be operated either manually or by a motor. If a control unit is provided for the clipping machine, the adjustment device can be controlled by the control unit. It is also possible to display the position of the discharge device relative to the components of the clipping machine arranged upstream the discharge device on a display device of the clipping machine.

In a further preferred embodiment, the sensor device may be adapted to indicate the current position of the discharge device relative to said components of the clipping machine. This indication may preferably be done by an optical and/or a sound indication and/or by displaying it on a screen. Thereby, operating errors may be prevented and the time for the preparation of the production process may be shortened.

The current position can be both an intermediate position and a final or proper position for the discharge device in which damage to the discharge device and/or to reversibly movable components of the clipping machine, such as the second displacer unit, is avoided.

As an alternative to the detection of the current or proper position of the discharge device, or additionally thereto, the sensor device may also be adapted to detect the current, in particular the proper distance between the discharge device and said components of the clipping machine located upstream the discharge device. The distance between the discharge device and said components of the clipping machine is preferably their distance along the transportation direction. Thereby, it is enabled that the downstream displacer unit, when moved in transportation direction for forming a plait-like portion, does not collide with the discharge device.

The current distance can be both an intermediate distance and a final or proper distance for the discharge device and the components of the clipping machine located upstream the discharge device. The proper distance is a distance in which damage to the discharge device and/or to reversibly movable components of the clipping machine, such as the second displacer unit, is avoided.

The clipping machine may advantageously be provided with a control unit for controlling the clipping machine, and the sensor device may preferably be coupled to said control unit. This allows the clipping machine to output a signal corresponding to the position of the discharge device relative to components of the clipping machine located upstream the discharge device, or its distance to said elements. Furthermore, in the case of a possible collision between the discharge device and said components of the clipping machine, a start of the clipping machine may be prevented.

It is further of advantage that the adjustment device is part of an alignment system which includes a first frame work and a second frame work movable relative to each other during the alignment process. This design allows the adjustment of the proper positioning of the discharge device relative to said components of the clipping machine, e.g. in adaption to the length of the plait-like portion to be formed to the sausage-shaped product, and, at the same time, an alignment of the discharge device to other parameters of the sausage-shaped product, like its diameter. Thereby, the time for the preparation of production process may further be shortened.

In a preferred design, the adjustment device includes a first engagement element arranged at the first frame work and a second engagement element arranged at the second frame work, which engage each other, with the sensor device being adapted to detect the current position or the current distance of the discharge device and said components of the clipping machine located upstream the discharge device on the basis of the movement of one of the engagement elements relative to the respective other engagement element. This design allows a secure and reliable detection of the position or the distance of the discharge device to the respective component of the clipping machine.

The relative movement between the first and second engagement elements may be detected in various ways, dependent on the specific design of the engagement elements. In one embodiment, the first engagement element is a toothed wheel and the second engagement element is a drive rack engaged by the toothed wheel mechanical engagement by the teeth of the engagement elements ensures a reliable detection of the relative movement, e.g. without slip between the engagement elements. However, also plane contact areas may be sufficient, e.g. in case that a frictional force prevents slip between said plane areas.

Moreover, the sensor device may be realized in various ways, like an optical sensor that is directed to an area moving relative to said optical sensor, or a single mechanical sensor element, like a wheel rotating during the relative movement between the discharge device and the respective component of the clipping machine. In a preferred constitution, the sensor device includes a first sensor element and a second sensor element which are movable relative to each other.

In order to enhance the precision of the measurement results, one of the first or second sensor elements may be coupled to one of the first or second engagement elements. For further enhancing the precision of the measurement results, the respective second or first sensor element may be coupled to the respective other engagement element. However, it is also sufficient when the first sensor element is fixedly coupled to a frame work or frame element, and that the second sensor element is movable relative to the first sensor element in accordance with the adjustment movement.

In a preferred embodiment, the sensor device comprises an inductive sensing element, the results of which may easily be used for controlling the clipping machine. Naturally, other types of sensors may be used for detecting the position or the distance of the discharge device to the respective component of the clipping machine, like an optical sensor, an electrical sensor which may include a potentiometer or a mechanical sensor including a strain gauge or the like.

There is further provided a method for operating a clipping machine according to the present invention. The method includes the steps of selecting a sausage-shaped product to be produced, detecting by the sensor device the position of the discharge device relative to components of the clipping machine located upstream the discharge device, and providing a signal, indicating the current position of the discharge device relative to said further components of the clipping machine or the current distance between the discharge device and said components of the clipping machine.

The inventive method may include one or more of the further steps of outputting a signal whether the current position or the current distance of the discharge device and said components of the clipping machine matches a position or distance requested on the basis of the selected sausage-shaped product to be produced, detecting by the sensor device the current position and/or the current distance of the discharge device during adjusting the position and/or distance of the discharge device and outputting a signal when the discharge device has reached the position or distance requested on the basis of the selected sausage-shaped product to be produced.

The clipping machine may be provided with a control unit for controlling the clipping machine, and the sensor device may be coupled to said control unit. In this case, the sensor signals may be transferred to the control unit of the clipping machine, which provides an indication to an operator, whether or not the discharge device is in a proper position, or the current position may be indicated for allowing the operator to adjust the proper position of the discharge device on the basis of this signal.

Additionally, the method may include the step of preventing or allowing the start of the clipping machine dependent on the signal received from the sensor device by the control unit.

The inventive method thereby provides all advantages explained in conjunction with the inventive clipping machine.

Further advantages and preferred embodiments of the present invention will be described in the following together with the drawings listed below. The expressions "left", "right", "below" and "above" used in the following description, are referred to the drawings in an alignment such that the reference numbers and the notation of the figures used can be read in normal orientation.

DETAILED DESCRIPTION

Figure 1:
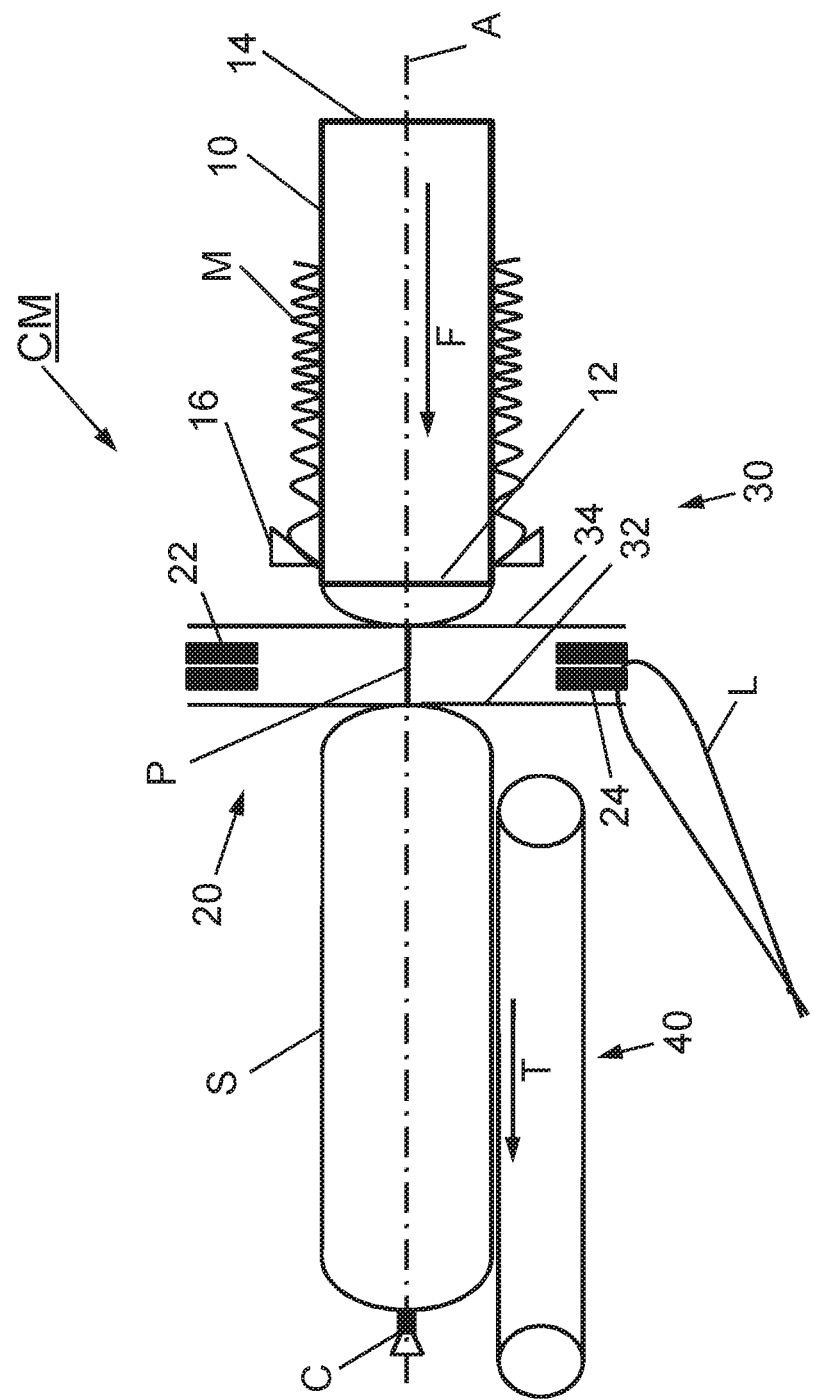
FIG. 1: is a schematic view showing the principal design of a clipping machine for producing sausage-shaped products.

A clipping machine CM for producing sausage-shaped products S, like sausages, which contain a flowable filling material in a tubular or bag-shaped packaging casing M, is shown schematically in FIG. 1, in particular its closing region. Clipping machine CM comprises a filling tube 10 having a longitudinally and horizontally extending central axis A, with a discharge opening for discharging the filling material at its left end 12 and a feeding opening for feeding the filling material in a feeding direction F to the discharge opening of filling tube 10, for example by a feeding pump (not shown), at its right end 14. Moreover, a casing brake assembly 16 is arranged on and coaxially with filling tube 10 in the region of left end 12 of filling tube 10. Filling tube 10 is made of a suitable material, like stainless steel.

A supply of tubular packaging casing M made of a thin sheet material is stored on filling tube 10 in a folded manner like a concertina. From the supply of tubular packaging casing M, tubular packaging casing M is pulled-off during the process of producing the sausage-shaped products S, in particular by the feeding pressure for filling the filling material into tubular packaging casing M, wherein casing brake assembly 16 provides a braking force for allowing a controlled pulling-off of tubular packaging casing M during the filling process.

Clipping machine CM further comprises a clipping device 20 for closing a filled tubular packaging casing M by applying closure means, like closure clips or closing clips C, to a plait-like portion P, and gathering means 30 for gathering the filled tubular packaging casing M and forming said plait-like portion P thereto. These components are all arranged downstream filling tube 10.

As can be inferred from FIG. 1, clipping device 20 is positioned immediately downstream left end 12 of filling tube 10, and coaxially aligned to filling tube 10. Clipping device 20 comprises a first and a second clipping tool 22, 24 formed by a punch 22 and a die 24. It has to be noted that punch 22 and die 24 may apply and close a single closure clip C for closing the rear end of the just filled tubular packaging casing M, or may apply and close two closure clips C at the same time, a first closure clip C for closing the rear end of the just filled tubular packaging casing M for forming a sausage-shaped product S, and a second closure clip C for closing the front end of a tubular packaging casing M subsequently to be filled.

Gathering means 30 include a first displacer unit 32 and a second displacer unit 34, wherein first displacer unit 32 is positioned downstream second displacer unit 34. First and second clipping tools 22, 24 of clipping device 20 may be positioned between first and second displacer units 32, 34, at least for applying and closing one or two closure clips C to plait-like portion P. First displacer unit 32 can reversibly be moved parallel to feeding direction F of the filling material.

If it is intended to suspend the sausage-shaped products S on a rod-like element, like a smoking rod, e.g. for further processing like cooking or smoking, a suspension element L, like a suspension loop, may be provided and attached to one end of each of the sausage-shaped products S, preferably the rear end, or at one end of a chain of sausage-shaped products S, once again preferably the rear end. Suspension element L may be fed to one of closing tools 22, 24, and may be fixed to the respective end of sausage-shaped product S by means of the closure clip C which closes said end of sausage-shaped product S.

For discharging a sausage-shaped product S just produced from clipping machine CM in a transportation direction T being substantially the same as feeding direction F, a discharge device 40 is arranged downstream clipping device 20, which may be a belt conveyor comprising a conveyor belt and guide rollers. In a simple case, discharge device 40 may be a chute. When discharging sausage-shaped products S just produced, suspension element L is caught by a catching device, like a catching needle, which guides suspension element L towards the rod-like element.

For suspending a sausage-shaped product S on said rod-like element R, said sausage-shaped product S may be carried out of clipping machine CM and fed to a hanging line (not shown).

In FIG. 1, discharge device 40 is only schematically shown and described as including a conveyor device, like a belt conveyor. It has to be understood that discharge device 40 comprises more elements and assemblies, like a frame work for being attached to clipping machine CM, or supporting and fixing elements for supporting the conveyor device and for fixing it to the frame work.

Figure 2:
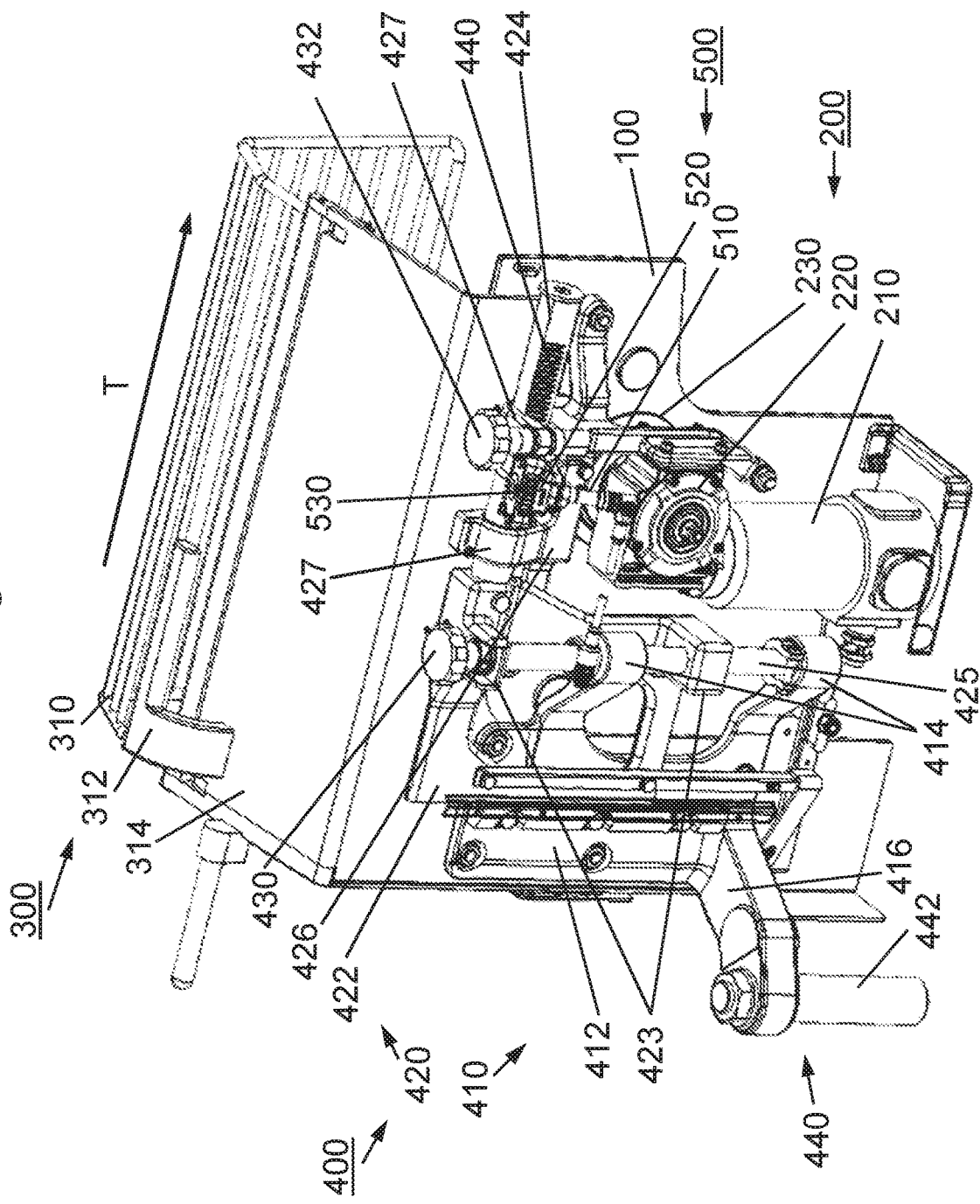
FIG. 2: is a perspective view to the rear side of a discharge device of a clipping machine, including an alignment system according to the present invention.

In FIG. 2, the rear side of a discharge device 40 of a clipping machine CM is shown, in which the conveyor device itself has been omitted.

The discharge device 40 according to FIG. 2 includes, besides the not-shown conveyor device, a frame unit 400 with a first frame work 410 and a second frame work 420. First and second frame works 410, 420 are of a generally planar design, and are arranged approximately parallel to each other, with second frame work 420 carrying a planar element 100 which forms the front side of a housing that covers frame unit 400 and further components, like a drive unit 200. First and second frame works 410, 420 extend from said planar element or front side 100 towards its rear side. Drive unit 200 has a drive device 210, like an electric motor, a gear unit 220 arranged at the output end of the rotor shaft of drive device or motor 210, and a coupling element 230 extending through the planar element or front side 100 and is adapted to be coupled with a counter coupling element of the conveyor device. Coupling element 230 and the counter coupling element engage each other for transferring a rotational movement of drive motor 210 to the conveyor device. This engagement may be realized by form closure or force closure between the coupling elements, and the coupling elements may have a suitable design.

First frame work 410 has an approximately planar frame body 412 and is arranged at least approximately vertically and parallel to front side 100 of the housing. Two receiving sleeves 414 are arranged at that vertical edge of first frame work 410 which faces towards drive unit 200. Receiving sleeves 414 are oriented vertically above each other. At the vertical edge opposite to receiving sleeves 414, and in particular at its lower end, a protrusion or cantilever 416 is arranged, extending approximately horizontally and in a rearward direction from first frame work 410.

At the free end of cantilever 416, a hinge bolt 442 is mounted, which, together with cantilever 416, forms an attachment unit 440 for attaching discharge device 40 to clipping machine CM for producing sausage-shaped products S which have to be conveyed by discharge device 40. Accordingly, clipping machine CM includes a counter portion to hinge bolt 442, which cooperates with hinge bolt 442 for attaching discharge device 40 to clipping machine CM. Attachment unit 440 thereby allows mounting discharge device 40 in an exact position at clipping machine CM, and a pivoting movement of discharge device 40, e.g. for maintenance or cleaning of clipping machine CM, and further, a quick mounting/demounting of discharge device 40 to or from clipping machine CM.

Second frame work 420 includes a first frame portion 422 of a generally planar design and being arranged approximately parallel to front side 100 of the housing. First frame portion 422 includes two receiving sleeves 423 arranged vertically above each other and facing from first frame portion 422 towards the rear side of discharge device 40.

Second frame work 420 further includes a second frame portion 426 which has an approximately planar body by which second frame portion 426 is fixedly attached to front side 100 of the housing. Two horizontally oriented receiving sleeves 427 are arranged at the upper edge of second frame portion 426.

A horizontally aligned bolt 424 is fixedly attached to the upper end of first frame portion 422 and extends parallel to front side 100 of the housing, and towards second frame portion 426. Second frame portion 426 is coupled to first frame portion 422 via horizontally arranged bolt 424, as it will be explained in greater detail below.

First frame work 410 and first frame portion 422 of second frame work 420 are arranged such that receiving sleeves 414 of first frame work 410 and receiving sleeves 423 of first frame portion 422 are aligned vertically above each other, with the lower receiving sleeve 423 of first frame portion 422 positioned between receiving sleeves 414 of first frame work 410. First frame portion 422 of second frame work 420 is coupled to first frame work 410 by a vertically arranged coupling bolt 425 which extends through receiving sleeves 414 of first frame work 410 and receiving sleeves 423 of first frame portion 422 of second frame work 420. Coupling bolt 425 is fixedly attached to first frame work 410, at least in axial direction, with its lower end received in lower receiving sleeve 414. First frame portion 422 of second frame work 420 may vertically reversibly shifted along coupling bolt 425.

For adjusting the vertical position of first frame portion 422 of second frame work 420 relative to first frame work 410, and for fixing first frame portion 422 in the selected position, an adjustment knob 430 is arranged at upper end of coupling bolt 425.

For moving first frame portion 422 of second frame work 420 along coupling bolt 425, coupling bolt 425 may comprise an external thread portion which engages an internal thread portion in upper receiving sleeve 423 of first frame portion 422. By rotating coupling bolt 425 via adjustment knob 430, first frame portion 422 of second frame work 420 may be shifted along coupling bolt 425 relative to first frame work 410.

It has to be understood that other elements than threads may be used for moving first frame portion 422 of second frame work 420 along coupling bolt 425 and securing it in the selected position, like clamping elements which may be loosened for enabling movement of first frame portion 422 and which may be fastened for fixing first frame portion 422 in the selected position.

Second frame portion 426 is coupled to first frame portion 422 via receiving sleeves 427 which are shifted onto horizontally arranged bolt 424 of first frame portion 422. Second frame portion 426 may reversibly be shifted in transportation direction T along bolt 424. For fixing second frame portion 426 in a selected position on bolt 424, one of receiving sleeves 427 is designed as a clamping sleeve which may be loosened or fastened by a clamping screw 432.

Figure 3:
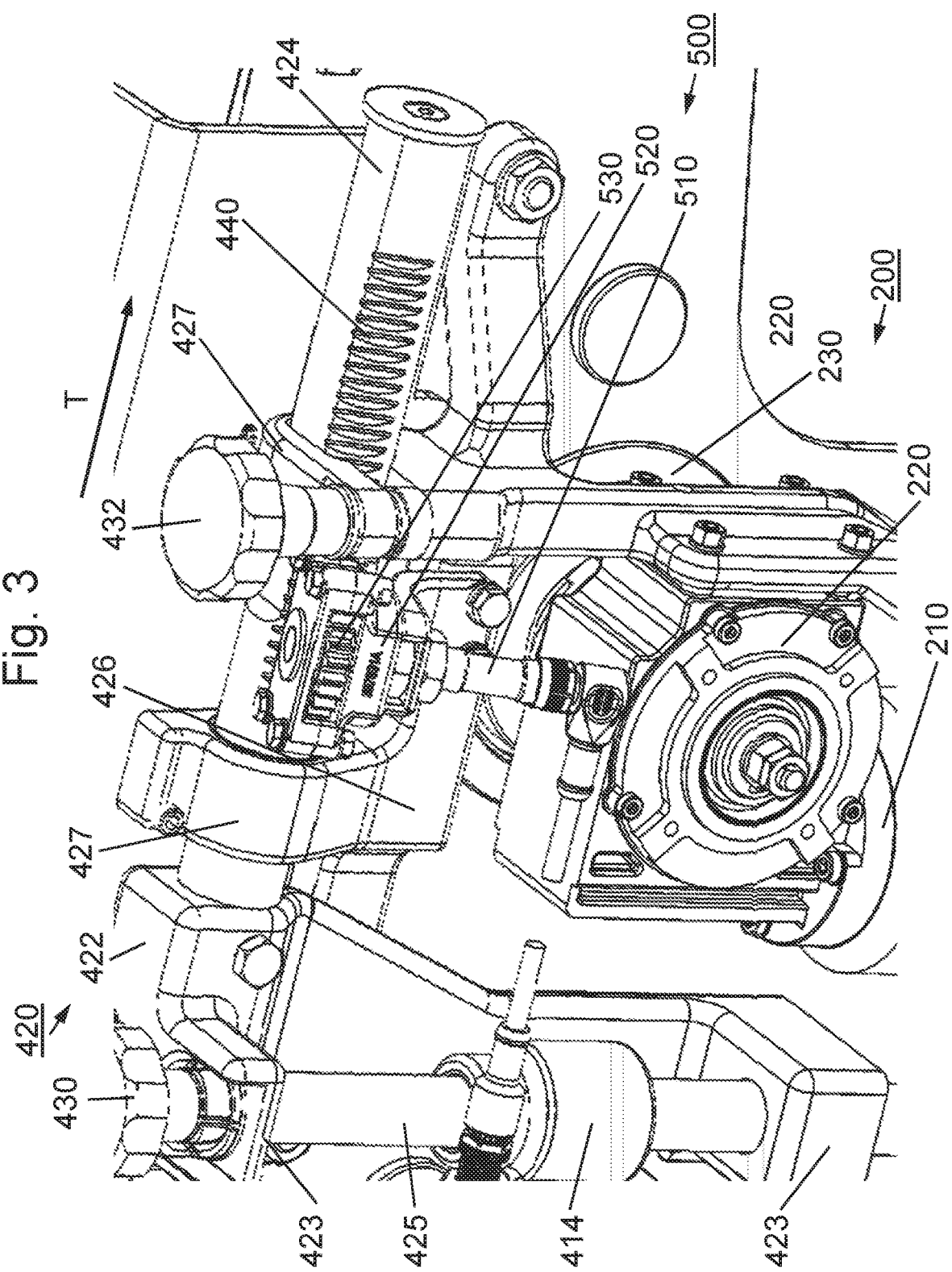
FIG. 3: is a detailed view to the alignment system according to FIG. 2.

As can be seen in FIGS. 2 and 3, front side 100 of the housing is mounted to second frame portion 426 of second frame work 420. Moreover, drive unit 200 is mounted to second frame portion 426 of second frame work 420 via gear unit 220. Thus, while shifting second frame portion 426 along horizontally bolt 424, also front side 100 together with the conveyor device mounted thereto, may reversibly be shifted in transportation direction T, for adjusting the horizontal position of the conveyor device relative to clipping machine CM, and thus, its distance to components of clipping machine CM arranged upstream the conveyor device.

The elements and assemblies for horizontally and vertically moving second frame work 420 relative to first frame work 410, namely first frame work 410, second frame work 420 with its first and second frame portions 422, 426, and bolts 424, 425 form the alignment system for aligning discharge device 40 to clipping machine CM.

Figure 4:
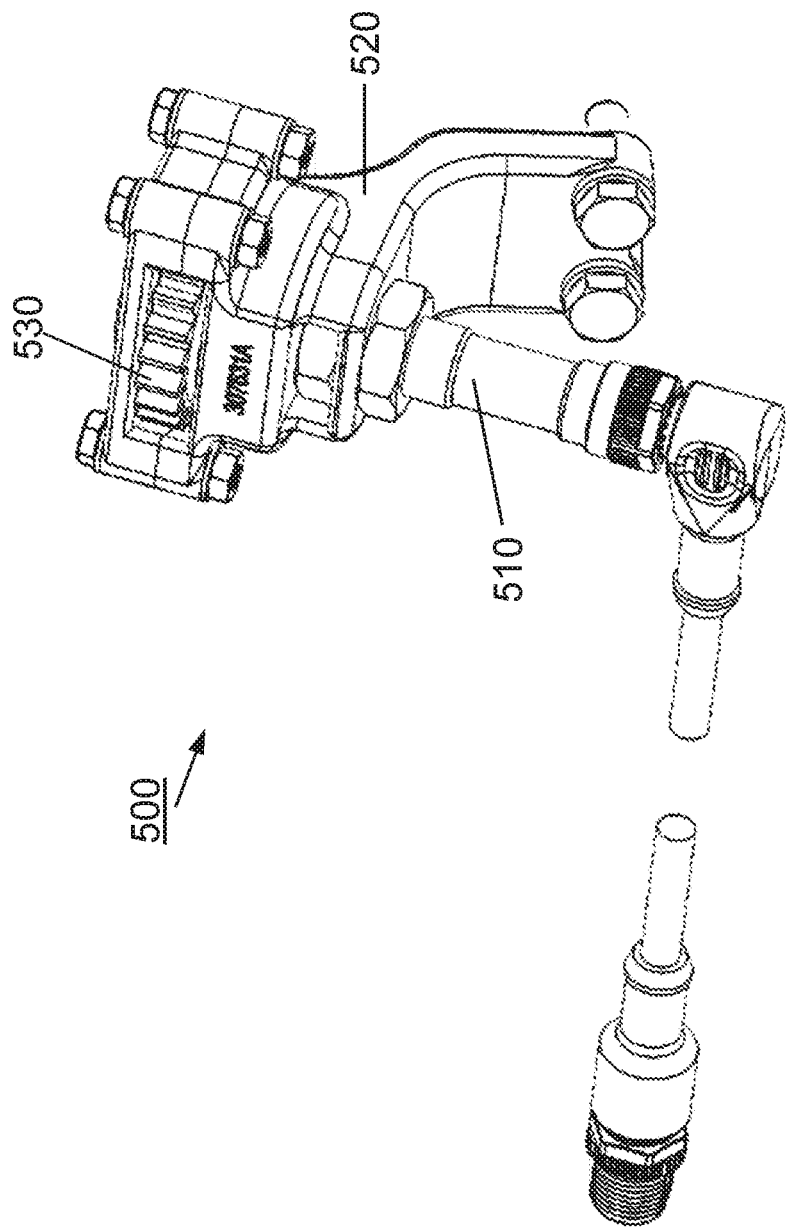
FIG. 4: is a perspective view to the rear side of a sensing device for use in the alignment system according to the present invention.

As can be seen in FIG. 2, and in more detail in FIG. 3, discharge device 40 is further provided with a sensor device 500 which is shown in greater detail in FIG. 4.

Sensor device 500 has a rod-shaped first sensor element 510 coupled by its upper end to a support structure 520 in the form of a housing, in which a toothed wheel 530 is arranged. First sensor element 510 is coaxially arranged with the rotation axis of toothed wheel 530, and with its upper end in close vicinity thereto. The lower end of sensor element 510 is coupled to the control unit of clipping machine CM by a respective wire or cable. A second sensor element (not visible) is arranged at the lower end of the rotation axis of toothed wheel 530 and fixedly mounted thereto, such that, upon rotation of toothed wheel 530, the second sensor element executes a rotational movement relative to first sensor element 510. Toothed wheel 530 exceeds support structure 520 in radial direction at two sides, as can be seen FIG. 4, which shows the rear side of sensor device 500. However, toothed wheel 530 also exceeds support structure or housing 520 also at its front side.

Horizontally arranged bolt 424 is provided with a flat portion extending in axial direction. At said flat portion a toothing 440 is arranged, such that bolt 424, at least partially, forms a drive rack. Toothing 440 faces away from second frame portion 426 and towards toothed wheel 530.

Sensor device 500 is mounted to second frame portion 426 by support structure or housing 520 such that that portion of toothed wheel 530 which extends housing 520 in a direction towards second frame portion 426, engages toothing 440 in bolt 424.

In this constitution, when horizontally moving the conveyor device by shifting second frame portion 426 along horizontal bolt 424, also sensor device 500 moves along bolt 424. Thereby, toothed wheel 530 which is in engagement with toothing 440 in bolt 424, rotates about its rotation axis. This rotation which corresponds to the length of the moving path of the conveyor device, is sensed by sensor device 500. A corresponding signal is output to the control unit of clipping machine CM, which includes information not only about the length of the moving path but also about the position of the conveyor device relative to other elements of clipping machine CM.

The elements, by means of which the adjustment of the position of the discharge device relative to components of the clipping machine may be executed, like the toothed wheel 530, horizontal bolt 424 with toothing 440 engaged by toothed wheel 530 and clamping screw 432 for securing the conveyor belt in the selected position, form the adjustment device for adjusting the position of the discharge device relative to said components of the clipping machine CM located upstream the discharge device.

Furthermore, a protection device 300 which at least partially covers the conveyor device, is provided, e.g. for preventing an operator from gripping into the conveyor device and into clipping machine CM to which discharge device 40 is mounted. Protection device 300 includes a protective grid 310 which covers the region immediately above the conveyor device, and which may be pivoted up and backwards by a handle 312. A horizontally arranged cover plate 314 extends from the upper end of front side 100 of the housing at least partially over the conveyor device. Protective grid 310 is pivotally mounted at the front most corner of cover plate 314.

For producing a sausage-shaped product S on clipping machine CM, tubular packaging casing M stored on filling tube 10 and closed at its front end by a closure clip C, is filled with filling material which is fed through filling tube 10 into tubular casing M in feeding direction F. After a predetermined portion of filling material is fed into tubular casing M, upper and lower displacer elements of first and second displacer units 32, 34 are moved from their opened position into their closed position for forming a gathered portion to the filled tubular casing M. Thereafter, first displacer unit 32 carries out a linear movement in a horizontal plane and coaxially to feeding direction F. Thereby, a plait-like portion P is formed to the gathered portion of tubular packaging casing M, and two closure clips C are applied to plait-like portion P and closed by clipping device 20, a first closure clip C for closing the just filled tubular casing M for forming a sausage-shaped product S and a second closure clip C for closing the front end of sausage-shaped product S subsequently to be produced. A cutting device (not shown) cuts tubular packaging casing M between the two closure clips C for severing the sausage-shaped product S just produced from the remaining tubular packaging casing M. Sausage-shaped product S just produced is discharged from clipping machine CM by discharge device 40.

For producing tightly filled sausage-shaped products S, after first and second displacer units have been brought into their closed position, first displacer unit 32 has to be moved in feeding direction F about only a short length sufficient to form a short plait-like portion P for applying two closure clips C thereto. In case that slackly filled sausage-shaped products S have to be produced, an elongated plate-like portion has to be formed by moving first displacer unit 32 in feeding direction F about a moving path having a corresponding length. The length of plait-like portion P corresponds to the desired filling degree. A longer plait-like portion P causes a lower filling degree, whereas a shorter plait-like portion P causes a higher filling degree of the sausage-shaped product S.

Dependent on the length of plait-like portion P to be formed to sausage-shaped product S, the conveyor device of discharge device 40 has to be arranged in a position or with a distance to other elements of clipping machine CM, particularly to gathering means 30, such that a collision of the conveyor device with first displacer unit 32 when being moved in feeding direction F, or transportation direction T respectively, for forming an elongated plait-like portion P, is avoided.

When starting the production process, the operator selects a product to be produced, e.g. by means of the control unit, in which various products together with the corresponding production parameters may be stored. These parameters may include amongst others the length of plait-like portion P of the selected sausage-shaped product S and the corresponding position of discharge device 40, and particularly the position of the conveyor device, or its distance to an element of clipping machine CM, like gathering means 30, a specific frame element or any other element suitable for providing a reliable reference point for adjusting discharge device 40.

Before, like by switching on clipping machine CM, at the same time or after a sausage-shaped product S to be produced has been selected, the current position of discharge device 40 is detected by sensor device 500. In the case that the current position of discharge device 40, and in particular the position of the conveyor device, matches the required position, a corresponding signal is output by the control unit of clipping machine CM, and the production process may be started.

In the case that the current position of discharge device 40 does not match the required position, the control unit outputs a signal to the operator, informing him about this mismatch. Moreover, the current position of discharge device 40 may be indicated and shown in a display. This indication may include the information whether the current position of discharged device 40 is too close to a respective reference point or too far away. Moreover, a distance may be displayed about which discharge device 40 has to be moved in order to match the required position or distance as well as the direction of movement.

For adjusting the position of discharge device 40, or particularly, the conveyor device, clamping screw 432 is loosened, and the conveyor device of discharge device 40 is shifted in a respective direction, in transportation direction T or in the counter direction, dependent on the current position of the conveyor device and the requested position.

During the adjustment movement of discharge device 40, particularly during moving the conveyor device along transportation direction T, toothed wheel 530 which is in engagement with toothing 440 in horizontal bolt 424, and sensor device 500 may permanently detect the current position of discharge device 40, such that the operator, during the adjustment movement, may be provided with the current position of discharge device 40, and thus, with an indication of the remaining length of the movement path to go.

Alternatively or additionally, the absolute value of remaining length of the movement path may be displayed.

Furthermore, when reaching the required position or distance, a signal may be output to inform the operator that the required position or distance is reached.

In the moment when discharge device 40 has reached the required position, the control unit without any time delay may display or output a signal that the desired position is reached.

The operator may than secure discharge device 40 in the required position, and the production process may be started.

It has to be noted that sensor device 500 has been described as including an inductive sensor which permanently detects the current position of the conveyor device of discharge device 40 or its distance to a reference point. Naturally, also other types of sensors, which are able to permanently detect the current position or a distance to a reference point, may be used in clipping machine CM.

Furthermore, sensor device 500 may detect the current position of discharge device 40 (or the conveyor device respectively), the distance of discharged device 40 to a reference point, which may be one of the displacer units, and/or the remaining distance of discharge device 40 to the required position.

Sensor device 500 may be adjusted to a reference point as the "zero point" such that each relative movement between first and second frame portions 422, 426 leads to an exact value of the distance of the conveyor device to said "zero point", and thus, to an exact value of the distance of the conveyor device to the reference point or element of clipping machine CM.

Naturally, it is also possible that sensor device 500 provides a signal to the control unit of clipping machine CM that corresponds to the relative movement between first and second frame portions 422, 426, The control unit of clipping machine CM may use this signal to compute or calculate the respective position, distance or remaining distance of discharge device 40, or particularly the conveyor device, to the required position, to the element of clipping machine CM or the reference point.

It has further to be noted that not only gathering means 30, a specific frame element or any other element of clipping machine CM may be used as a reference point for adjusting discharge device 40. It is also possible that additionally or alternatively thereto, an additional component which may temporarily be attached to clipping machine CM, and which preferably extends from clipping machine CM in transportation direction T, like an additional chute, may provide a reference point for the adjustment of discharge device 40. In this case, the presence of said additional component may be transmitted to the control unit of the clipping machine CM, like by a corresponding sensing element, such that the control unit automatically uses the correct reference point for the adjustment of discharge device 40.

What is claimed is:

1. A clipping machine for producing sausage-shaped products, by filling a flowable filling material into a tubular or bag-shaped packaging casing and closing said packaging casing by at least one closure clip, the clipping machine comprising:
   a filling tube for feeding the filling material in a feeding direction into the tubular or bag-shaped packaging casing stored on the filling tube and being closed at its front end;
   gathering means for gathering the filled packaging casing and for forming a gathered portion thereto, wherein the gathering means include a first displacer unit and a second displacer unit, and wherein the second displacer unit is reversibly movable in the feeding direction for forming a filling material free plait-like portion at the gathered portion of the filled packaging casing;
   a clipping device having at least a first and a second closing tool being reversibly movable between an opened position and a closed position, for applying at least one closure clip to the plait-like portion and closing said closure clip when the closing tools are in their closed position; and
   a discharge device for discharging a sausage-shaped product just produced from the clipping machine in a transportation direction,
   wherein a position of the discharge device along the transportation direction and relative to components of the clipping machine located upstream the discharge device can be adjusted, and
   that a sensor device is provided for detecting the position of the discharge device relative to components of the clipping machine located upstream the discharge device.

2. The clipping machine according to claim 1,
   wherein an adjustment device is provided for adjusting the position of the discharge device relative to said components of the clipping machine located upstream the discharge device.

3. The clipping machine according to claim 2,
   wherein the adjustment device is part of an alignment system which includes a first frame work and a second frame work movable relative to each other during the alignment process.

4. The clipping machine according to claim 3,
   wherein the adjustment device includes a first engagement element arranged at the first frame work and a second engagement element arranged at the second frame work, which engage each other, with the sensor device being adapted to detect the current position or the current distance of the discharge device and said components of the clipping machine located upstream the discharge device on the basis of the movement of one of the engagement elements relative to the respective other engagement element.

5. The clipping machine according to claim 4,
wherein the first engagement element is a toothed wheel and the second engagement element is a drive rack engaged by the toothed wheel.

6. The clipping machine according to claim 4,
wherein the sensor device includes a first sensor element and a second sensor element which are movable relative to each other, and
wherein one of the first or second sensor elements is coupled to one of the first or second engagement elements.

7. The clipping machine according to claim 1,
wherein the sensor device is adapted to indicate the current position of the discharge device relative to said components of the clipping machine.

8. The clipping machine according to claim 1,
wherein the sensor device is adapted to detect the current distance between the discharge device and said components of the clipping machine.

9. The clipping machine according to claim 1,
wherein a control unit for controlling the clipping machine is provided, and wherein the sensor device is coupled to said control unit.

10. The clipping machine according to claim 1,
wherein the sensor device includes a first sensor element and a second sensor element which are movable relative to each other.

11. The clipping machine according to claim 1,
wherein the sensor device comprises an inductive sensing element.

12. A method for operating a clipping machine according to claim 1, the method includes the steps of:
selecting a sausage-shaped product to be produced,
detecting by the sensor device the position of the discharge device relative to components of the clipping machine located upstream the discharge device, and
providing a signal, indicating the current position of the discharge device relative to said components of the clipping machine.

13. The method according to claim 12,
further comprising the step of outputting a signal whether the current position of the discharge device matches a position requested on the basis of the selected sausage-shaped product to be produced.

14. The method according to claim 12,
further comprising the step of detecting by the sensor device the current position of the discharge device during adjusting the position of the discharge device.

15. The method according to claim 14,
further comprising the step of outputting a signal when the discharge device has reached the position requested on the basis of the selected sausage-shaped product to be produced.

* * * * *